Oct. 28, 1969 R. L. MORINE 3,474,893
CONVEYOR
Filed Oct. 6, 1967 2 Sheets-Sheet 1
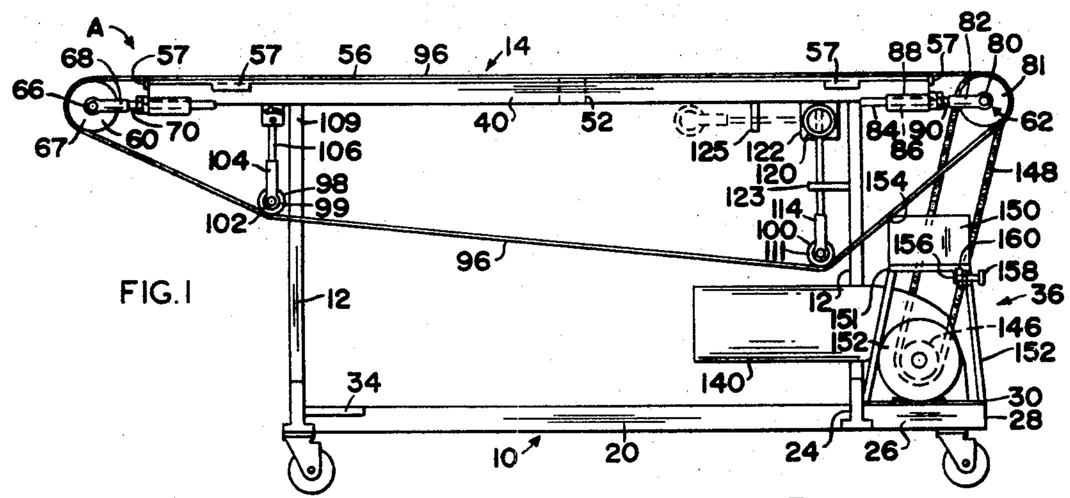
FIG. 1
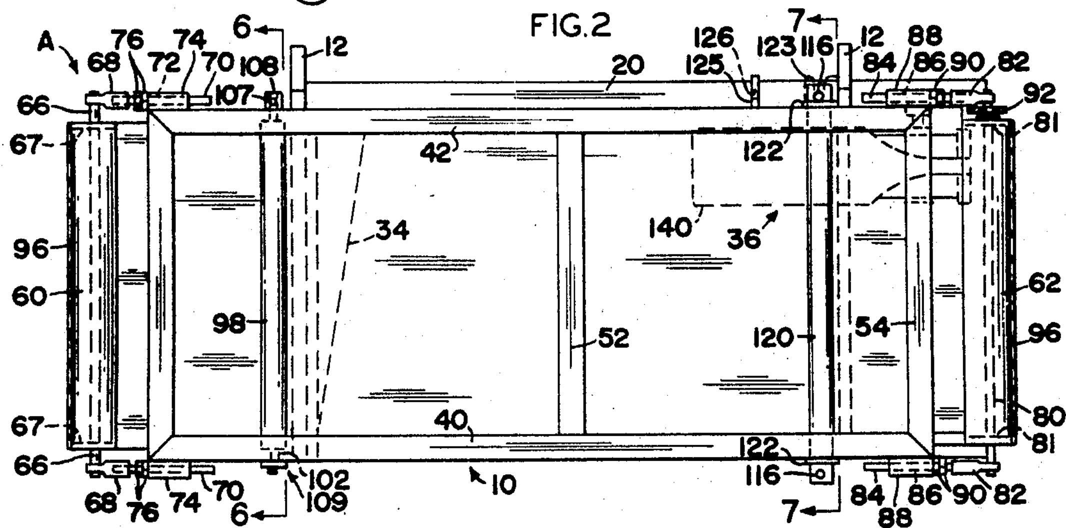
FIG. 2
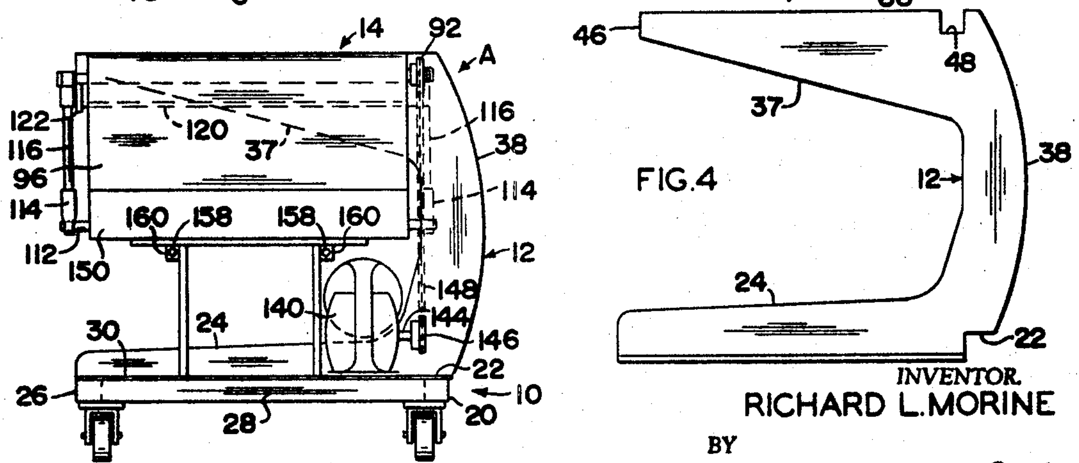
FIG. 3
FIG. 4
INVENTOR.
RICHARD L. MORINE
BY
Meyer, Tilberry & Body
ATTORNEYS.

Oct. 28, 1969 R. L. MORINE 3,474,893
CONVEYOR
Filed Oct. 6, 1967 2 Sheets-Sheet 2
FIG.5
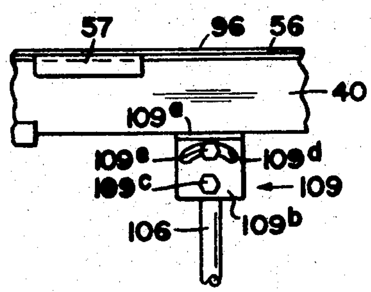
FIG.6
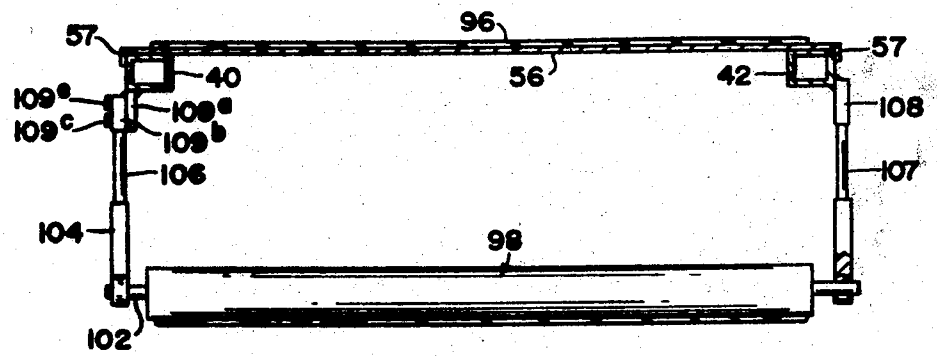
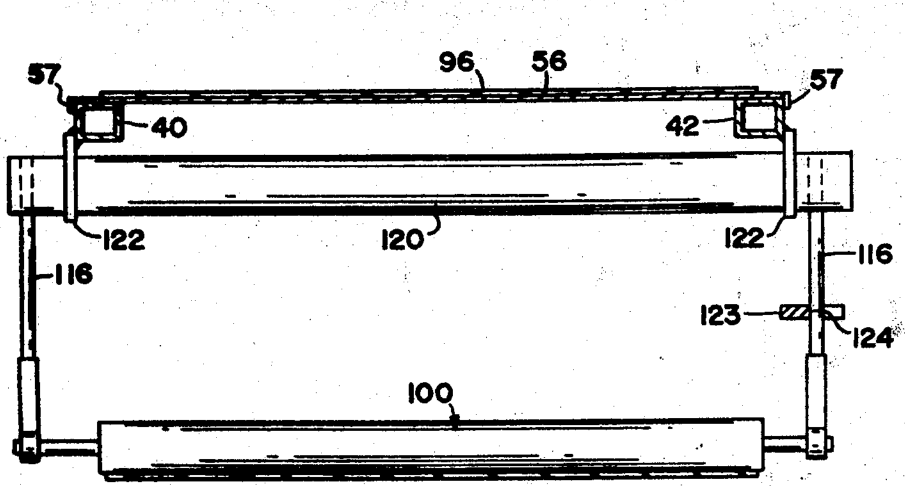
FIG.7
INVENTOR.
RICHARD L. MORINE
BY
*Meyer, Tilberry & Body*
ATTORNEYS.

United States Patent Office 3,474,893

Patented Oct. 28, 1969

1

3,474,893

CONVEYOR

Richard L. Morine, Mentor, Ohio, assignor to Food Equipment Development Corporation, Mentor, Ohio, a corporation of Ohio Filed Oct. 6, 1967, Ser. No. 673,330
Int. Cl. B65g 15/28
U.S. Cl. 198—129 5 Claims

ABSTRACT OF THE DISCLOSURE

An improved portable endless belt type conveyor which includes an elongated, horizontally extending base frame which supports at least a pair of U-shaped frames. Each of the U-shaped frames includes first and second generally parallel leg portions connected at one end by a base member. The U-shaped frames are connected to the base frame at spaced positions longitudinally thereof with their respective base members extending vertically upwardly therefrom and their respective leg portions extending in the same directions transversely of the base frame. Means defining an elongated, horizontally extending conveyor table are connected transversely to the second leg portions of the U-shaped frame members and are supported thereby. Horizontally positioned, elongated conveyor belt guide rollers extend transversely of the conveyor table and are adjustably mounted at opposite longitudinal ends thereof. The rollers are positioned so that their top surfaces are at substantially the same elevation as the top of the conveyor table. An endless conveyor belt extends longitudinally of the conveyor table and completely encircles the conveyor table, the guide rollers, and the second leg portions of the U-shaped frame members. Belt tensioning roller means are mounted subjacent the conveyor table and extend transversely thereof for engaging the conveyor belt and applying a tensioning force to its lower stretch. Additionally, means are provided for moving the belt tensioning roller means to a non-tensioning position wherein the conveyor belt can be removed transversely of the conveyor table.

The present invention is directed toward the conveyor art and, more particularly, to an improved portable conveyor of the endless belt type.

The invention is especially suited for use in the baking and food processing industries and will be described with particular reference thereto; however, it is appreciated that the invention is capable of broader application and could be used for a variety of purposes.

In my copending United States patent application, Ser. No. 607,936, filed Jan. 9, 1967, now Patent No. 3,419,052, I have disclosed an improved dispensing apparatus which is especially useful in bakeries and the like, for dispensing cake batters, etc., into pans conveyed past the apparatus at fixed speeds on an endless belt conveyor. The dispensing apparatus is easily portable so as to be capable of being used in a variety of different locations within a plant. The only requirement for its use is that it be used in conjunction with a conveyor capable of conveying pans past the apparatus at a relatively constant speed.

Although a variety of conveyors are available which can be used, most of these conveyors are, for one reason or another, less than completely satisfactory. For example, in order to meet the sanitation requirements of most states, the conveyors must be capable of being readily and easily cleaned. Additionally, the conveyors used with the noted dispensing apparatus should preferably be relatively light weight and easily portable so that the apparatus can be used to perform a variety of different dis-

2 pensing functions at different locations within a plant. Further, the conveyors should be arranged to allow the belts to be quickly removed and replaced without substantial disassembly and readjustment so as to facilitate the frequent cleaning required.

The present invention provides an improved portable conveyor of the endless belt type which meets all of the above requirements and is especially suited for use with the noted dispensing apparatus. Because of its unique construction, the conveyor belt, as well as the main guide rollers, can be removed and replaced in a matter of seconds without readjustment or removal of any other components of the conveyor.

In accordance with the present invention, there is provided an improved portable endless belt type conveyor which includes an elongated, horizontally extending base frame which supports at least a pair of U-shaped frames. Each of the U-shaped frames includes first and second generally parallel leg portions connected at one end by a base member. The U-shaped frames are connected to the base frame at spaced positions longitudinally thereof with their respective base members extending vertically upwardly therefrom and their respective leg portions extending in the same directions transversely of the base frame. Means defining an elongated, horizontally extending conveyor table are connected transversely to the second leg portions of the U-shaped frame members and are supported thereby. Horizontally positioned, elongated conveyor belt guide rollers extend transversely of the conveyor table and are adjustably mounted at opposite longitudinal ends thereof. The rollers are positioned so that their top surfaces are at substantially the same elevation as the top of the conveyor table. An endless conveyor belt extends longitudinally of the conveyor table and completely encircles the conveyor table, the guide rollers, and the second leg portions of the U-shaped frame members. Belt tensioning roller means are mounted subjacent the conveyor table and extend transversely thereof for engaging the conveyor belt and applying a tensioning force to its lower stretch. Additionally, means are provided for moving the belt tensioning roller means to a non-tensioning position wherein the conveyor belt can be removed transversely of the conveyor table.

Accordingly, a primary object of the present invention is the provision of a conveyor of the type described wherein the conveyor table and belt assembly is supported in cantilever fashion.

Another object is the provision of a conveyor of the type described wherein the conveyor belt and the slider bed or support table can be quickly removed for cleaning.

A further object is the provision of a portable endless belt type conveyor which is simple in construction and of pleasing appearance.

Yet another object is the provision of a conveyor which is arranged for easy cleaning and is especially suited for use in food handling or processing plants.

Yet another object is the provision of an endless belt type conveyor wherein the belt can be removed without the removal of any other parts of the conveyor.

A still further object is the provision of a conveyor which is extremely light in weight and yet rugged in construction.

Still another object is the provision of a conveyor wherein the conveyor belt and its guide rollers can be removed without removal or disassembly of any portions of the conveyor.

These and other objects and advantages will become apparent from the following description when read in conjunction with the accompanying drawings wherein:

FIGURE 1 is a front elevational of an improved endless-belt type conveyor formed in accordance with a preferred embodiment of the present invention;

FIGURE 2 is a plan view of the conveyor of FIGURE 1 with the conveyor belt and a portion of the conveyor table removed to more clearly show the details of construction;

FIGURE 3 is a right end elevational of the conveyor of FIGURE 1;

FIGURE 4 is a detail view of one of the frame members;

FIGURE 5 is a detail view of the adjustable mounting of one of the guide rollers; and, FIGURES 6 and 7 are cross-sectional views taken on lines 6—6 and 7—7 respectively, of FIGURE 2.

Referring now to the drawings, wherein the showings are for the purpose of illustrating a preferred embodiment of the invention only, and not for the purpose of limiting same, FIGURE 1 shows the front elevation of the conveyor A which is broadly comprised of an elongated, horizontally extending base frame 10 and a pair of spaced, upwardly extending U-shaped frame members 12 which support a horizontally extending conveyor table and belt assembly 14.

Preferably, the main structural components of the conveyor are formed substantially entirely from cast and extruded aluminum members joined by welding. This eliminates painting, etc. and allows the unit to be regularly cleaned with high pressure water and steam without fear of internal corrosion.

As best seen in FIGURES 1 and 3, the base frame 10 includes a horizontally positioned extruded aluminum tubular member which is welded to the lower leg portions 24 of the U-shaped frame members 12. The member 20 is received in recesses 22 formed in the leg portions 24. As shown, the member 20 extends from left frame member 12 to a position beyond the right frame member 12. A similar tubular member 26 extends rightwardly from the forward end of leg portion 24 of right frame member 12. The right hand ends of members 26 and 20 are connected by a transversely extending member 28. Preferably, the ends of the members 26, 22, and 28 are mitred and welded so as to provide a completely sealed frame. The base frame is further rigidified by a triangular shaped plate 34 which is welded through its length to the leg portion 24 of the left U-shaped frame member 12 and the frame member 22, as shown in FIGURES 1 and 2. Additionally, a rectangular plate 30 is welded to the top of the right hand end of the base frame and provides a support for the drive unit 36.

Although not necessary to the present invention, the U-shaped frame members 12 are preferably one piece aluminum castings. And, as best shown in FIGURES 2 and 4, each includes the previously mentioned leg portions 24 and a second generally parallelly extending upper leg portion 37. A vertically extending portion 38 connects the right end of the two leg portions 24 and 37, and provides the support for the conveyor table and belt assembly 14.

As best shown in FIGURE 1, the conveyor table comprises a rectangular, horizontally extending frame formed from aluminum tubing of rectangular cross-section. As shown, a pair of parallelly extending members 40 and 42 are respectively welded to the front ends 46 and the walls of a recess 48 formed in the rear of the upper leg portions 37 of the U-shaped frame members 12. Three transversely extending frame members 50, 52 and 54 are welded between the members 42 and 40 to provide the necessary transverse rigidity. The upper conveyor table surface is formed by an aluminum sheet 56 which simply sets on the top of the frame members and is contained thereon by having lips or edge portions 57 turned down to maintain it on the table. This allows the support surface to be removed so that the frame of the conveyor can be easily cleaned by the use of steam or high pressure water. As is apparent, because the entire frame is of welded aluminum construction, it is extremely light weight and has no closed recesses or rivets, screws and other dirt or food particle catching connecting means.

Positioned at each end of the conveyor table and supported thereby are the main guide rollers 60 and 62. Rollers 60 and 62 are formed from relatively heavy walled aluminum tubes and are machined so as to have the required crown. Each of the rollers are identically mounted and arranged so as to be adjustable longitudinally of the conveyor table, as well as individually adjustable to vary their parallelism to assure proper tracking of the belt. As shown, roller 60 has a central shaft 66 which extends longitudinally through the roller and is connected to plates 67 welded to the ends of the roller. The outer ends of the shaft 66 are each received in conventional rod end members 68. Members 68 contain conventional ball units through which shafts 66 extend. This provides freedom of movement so that the shafts 66 do not have to pass through the rod end at exactly a right angle, thus allowing the roll to be adjusted so as to be positioned at the most desirable location for proper tracking of conveyor belt. The means for positioning or adjusting each of the rod ends comprises threaded studs 70 which extend through openings 72 formed in rectangular aluminum blocks 74, which are welded to the outside of the conveyor table. The studs 70 are freely slidable in the openings 72 and are provided with adjusting nuts 76 which allow their position relative to the blocks 74 to be varied.

Roller 62 is constructed in the same manner as roller 60 and has a main shaft 80 which extends longitudinally therethrough and is connected to end plates 81. The outer ends of shaft 80 are received in rod ends 82, constructed identically to rod ends 68. Rods 82 are similarly provided with threaded studs 84 which pass through openings 86 formed in rectangular aluminum support blocks 88 respectively welded to the opposite sides of the right hand end of the conveyor table. A pair of adjusting nuts 90 permit these rods to be adjusted longitudinally of the table. Connected to the rear end of shaft 80, as viewed in FIGURE 2, is a sprocket 92 which functions to drive the roller and conveyor belt through a drive train subsequently to be described.

As best shown in FIGURE 1, an endless conveyor belt 96 extends completely around the longitudinal dimension of the conveyor table and over the guide rollers 60 and 62. Preferably, the belt is formed from material which permits it to be washed in a commercial washing machine so that it can be easily cleaned at regular intervals.

The belt is of a length sufficient so that its lower run is a substantial distance beneath the lower surface of the conveyor table. The lower run of the belt is guided by a pair of horizontally positioned, transversely extending rollers 98 and 100. Roller 98 is formed from a section of aluminum pipe provided with end plates 99 and a centrally extending shaft 102. The roller 98 is supported subjacent the roller table by rod ends 104 and support shafts 106 and 107. The rear support shaft 107 is connected to a rectangular aluminum block 108 welded to the rear of the conveyor table. The front support shaft 106 is mounted from an adjustable bracket unit 109 which permits the position of the roller 98 to be shifted slightly to feed the conveyor belt 98 to roller 60 for proper tracking. As best shown in FIGURE 5, adjustable bracket 109 includes a first plate **109*a* which is welded to the lower side of member 40 and extends vertically downwardly therefrom. A second plate 109*b* is welded to the upper end of rod 106 and is pivotally connected to plate 109*a* by a bolt 109*c*. An arcuate slot 109*d* is formed through plate 109*a* and a bolt 109*e* extends through the slot into threaded engagement with an opening formed in plate 109*a*. As is apparent, by loosening bolt 109*e*, the plate 109*b* and rod 106 can be pivoted to adjust the position of roller 98. Consequently, it is a simple matter to position roller 98 to assure that the belt 96 is properly fed to roller 60**.

The lower roller 100 functions as the belt tensioning means and for this reason the upper ends of the rods 116 are welded to a horizontally extending aluminum tube 120. Tube 120 is supported for rotation in a pair of bearing plates 122, which are welded to and extend downwardly from members 40 and 42. Tube 120 and, consequently, roller 100 are arranged to be releasably maintained in the position shown in FIGURE 1 by virtue of a cam plate 123 which is welded to the side of portion 38 of the right frame member 12. As best shown in FIGURE 2 plate 123 has an inwardly extending cam slot 124 which receives the rear rod 116. To release the roller 100 and move it to the upper non-tensioning position shown dotted, the rear rod 116 is pulled horizontally out of the slot 124. This moves both the tube 120 and roller 100 a short distance horizontally. With the rod 116 out of slot 124, the assembly can be pivoted to the dotted line position. A plate 125, welded to the back of member 40, is provided with a slot 126 which receives rod 116 for maintaining the assembly in the upper position.

As is apparent, because the conveyor table and belt assembly is supported in cantilever fashion from the U-shaped frame members 12, the belt 96 can be quickly removed from the conveyor without disassembly or removal of any other components. Note that by merely releasing the tensioning roller 100 and swinging it to its upper position, the belt can be simply slid transversely of the conveyor table and removed from the forward side of the conveyor. This is especially important when the conveyor is used in the baking or food processing industry, where frequent cleaning of the unit is required. Additionally, because of the support arrangement of the guide rollers 60 and 62 it is possible to simply remove the rollers by withdrawing their respective support rods 72 and 84 from the support blocks 74 and 88.

Means for driving the conveyor belt 96 includes a conventional electric motor and gear reducing unit 140 which is carried on plate 30 of the base frame 10. The output shaft 144 of the unit 140 is provided with a sprocket 146, which is keyed or otherwise connected to the end thereof. Sprocket 146 is drivingly connected with sprocket 92 of roller 62 by a roller chain 148.

In order to continually clean the upper surface of the conveyor belt 96, an elongated pan or receptacle 150 is positioned beneath the lower right end of the lower run of the belt. As best shown in FIGURE 1, the pan 150 is supported from a plate 151 carried by legs 152, which extend upwardly from the right end of the base frame 10. The pan is arranged so as to have its upper left edge or lip in engagement with the belt 96 so as to scrape any food particles or other materials from the belt as it passes thereby. In order to allow the pan to be adjusted relative to the belt, a pair of plates or fingers 156 extend downwardly from its lower surface through slots in plate 151. Fingers 156 are engaged by adjusting screws 158 which are threadably received in plates 160 welded to the support frame. As is apparent, the adjusting screws allow the horizontal position of the pan 150 to be varied to position the upper lip 154 so that it properly engages the surface of the belt 96.

The invention has been described in great detail, sufficient to enable one of ordinary skill in the conveyor art to make and use the same. Obviously, modifications and alterations of the preferred embodiment will occur to others upon the reading and understanding of the specification, and it is my intention to include all such modifications and alterations as part of my invention so far as they come within the scope of the appended claims.

Having thus described my invention, I claim:

1. A portable endless belt type conveyor comprising:

(a) an elongated horizontally extending base frame;

(b) at least a pair of U-shaped frames each including first and second generally parallel leg portions connected at one end by a base member;

(c) said U-shaped frames connected to said base frame at spaced positions longitudinally thereof with their respective base members extending vertically upwardly therefrom and their respective second leg portions extending in the same direction transversely of the base frame;

(d) means defining an elongated horizontally extending conveyor table connected transversely of said second leg portions of said U-shaped frame members and supported thereby, said conveyor table extending outwardly beyond each of said frame members;

(e) horizontally positioned, elongated conveyor belt guide rollers extending transversely of said conveyor table at opposite longitudinal ends thereof; said rollers being positioned so that their top surfaces are at substantially the same elevation as the top of said conveyor table, and means for adjustably supporting said rollers from said table while permitting said roller to be slidably removed therefrom;

(f) an endless conveyor belt extending longitudinally of said conveyor table and completely encircling said conveyor table, said guide rollers, and said second leg portions of said U-shaped frame members;

(g) a belt tensioning roller means mounted subjacent said conveyor table and extending transversely thereof at a tensioning position for engaging the inner surface of said conveyor belt and applying a tensioning force thereto;

(h) pivotal means for moving said tensioning roller means to a nontension position wherein said conveyor belt can be removed transversely from the conveyor table; and, (i) means for latching said tensioning roller in said tensioning and nontension position.

2. The conveyor as defined in claim 1 wherein drive means are provided for rotating one of said guide rollers.

3. The conveyor as defined in claim 1 including wheels supporting said base frame.

4. The conveyor as defined in claim 1 including a conveyor belt cleaning member mounted on said base frame and arranged to engage the lower stretch of said belt.

5. The conveyor as defined in claim 1 including a third guide roller mounted from the conveyor table and extending a substantial distance therebelow to maintain the lower stretch of said belt spaced below said conveyor table.

References Cited

UNITED STATES PATENTS

| | | | |
|---|---|---|---|
| 272,324 | 2/1883 | Renwick. | |
| 2,393,724 | 1/1946 | Vickers | 198—230 |
| 2,408,863 | 10/1946 | Lisota | 198—233 |
| 2,850,148 | 9/1958 | Rasmusson | 198—190 X |
| 3,209,892 | 10/1965 | Jones | 198—41 |
| 3,291,287 | 12/1966 | Rehm | 198—190 |

OTHER REFERENCES

Shingle & Gibb Co., Jan., 1949.

EDWARD A. SROKA, Primary Examiner

U.S. Cl. X.R.

198—204, 233